UNITED STATES PATENT OFFICE.

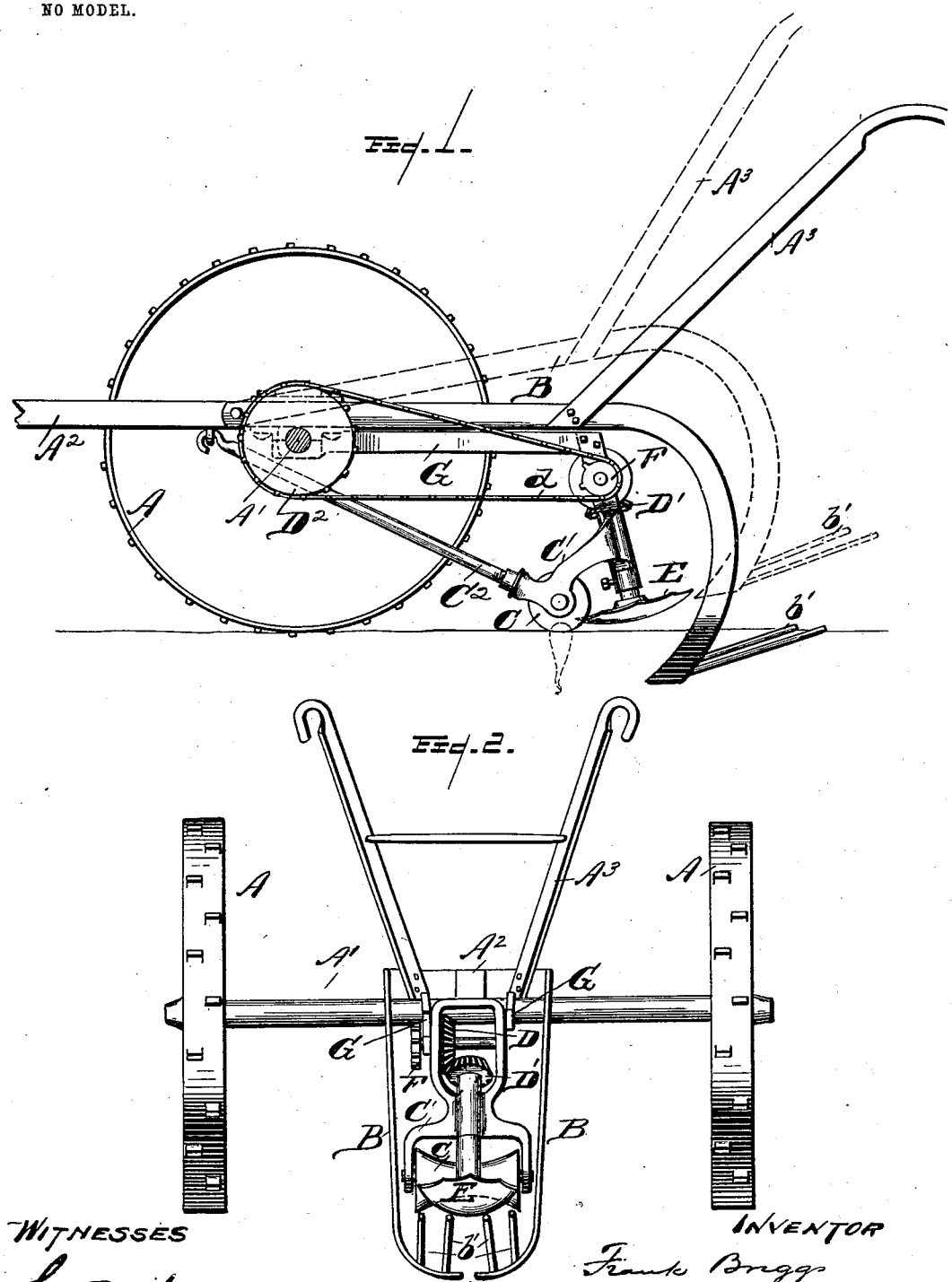

FRANK BRIGGS, OF CARO, MICHIGAN.

BEET TOPPER AND PULLER.

SPECIFICATION forming part of Letters Patent No. 722,484, dated March 10, 1903.

Application filed June 3, 1901. Serial No. 62,818. (No model.)

*To all whom it may concern:*

Be it known that I, FRANK BRIGGS, a citizen of the United States, residing at Caro, county of Tuscola, State of Michigan, have invented a certain new and useful Improvement in Beet Toppers and Pullers; and I declare the following to be a full, clear, and exact description of the invention, such as will enable others skilled in the art to which it pertains to make and use the same, reference being had to the accompanying drawings, which form a part of this specification.

My invention relates to an improvement in beet toppers and pullers shown in the drawings and more particularly pointed out in the claims.

Figure 1 is a side elevation, partly in section, of the machine. Fig. 2 is a rear elevation of the same.

The object of my invention is to provide a machine simple in operation that will readily top the beet while harvesting them. In producing sugar from beet-roots only that portion of the root grown below the surface of the earth is available. This requires the removal of the leaf-crown, and this part of the work is called "topping." At the present time after the beets have been removed from the earth this leaf-crown and portion of the beet-root which was above the surface of the ground are removed by a knife or other sharp instrument. This process is slow, laborious, and costly to the producer. The beet-roots are paid for by the ton, the price paid being regulated by the percentage of sugar in the juice of the root. The portion of the root grown above the surface of the earth is very deficient in sugar and when left on the beet reduces the percentage of sugar. It is therefore desirable that the root be severed at a point just below the lowest leaf-scar. This invention overcomes the loss occasioned by improper topping and removal of too much of the beet and greatly reduces the cost of production and increases the tonnage.

In the drawings, A represents the wheels; A', the axle; $A^2$, the tongue; $A^3$, the handles.

B B are hook-shaped frames provided at the rear with inclined subsoil-bars $b'$, adapted to force the beets cut out of the ground, delivering them at the rear of the machine.

C is a concave roll journaled in the frame C'.

D D' are gears, also journaled in the frame C'.

E is a rotary cutter having a vertical adjustment and mounted on the same shaft with the gears D'.

F is a sprocket-wheel mounted on the same shaft with the gear D and driven by the sprocket-chain $d$ from the gear $D^2$, mounted on the axle A'.

G represents braces secured to the frame C' and sleeved on the axle A', the construction being such as to permit the lateral adjustment, if desired.

$C^2$ is a rod secured to the frame C' and having a jointed connection with the tongue $A^2$.

The operation of the machine is as follows: The hook-shaped frames B enter the ground to about the depth of the tap-root, and as the machine is drawn forward the concave roll C passes over the tops of the beet, forcing the leaves on the root forward out of the way while the rotary cutter E cuts off the tops. As the machine moves ahead the inclined bars $b'$ engage the root, forcing it out of the ground, delivering it back of the machine. By pivoting the frames B B, as shown, they may be forced to any depth required or raised above the soil, as desired. The concave roll C serves to force and hold the leaf-top of the beet out of the way and also lifts the cutter sufficiently, so that the cutter will sever the tops from the root at the proper point.

By forming the rotary cutter E dish-shaped, as shown, the cutter will engage the root in such a manner as to sever the top from the lower part of the root in practically a horizontal line.

What I claim is—

1. In a machine of the class described, the combination of a main driving-shaft bearing two traction-wheels, a pivoted arm bearing a sleeve, a vertical shaft mounted in said sleeve and bearing a horizontal cutter, means for connecting said vertical shaft and said driving-shaft, and means for adjusting said arm to regulate said cutter, substantially as described.

2. In a machine of the class described, the combination of a driving-shaft bearing two traction-wheels, a pivoted arm bearing a sleeve provided with upwardly-extending arms, a first pinion mounted between said arms, a vertical shaft mounted in said sleeve and bearing a pinion meshing with said first pinion, means for connecting said first pinion and said driving-shaft, substantially as described.

In testimony whereof I sign this specification in the presence of two witnesses.

FRANK BRIGGS.

Witnesses:
T. C. QUINN,
F. A. WHEAT.